H. L. DOOLEY.
PLANTER.
APPLICATION FILED DEC. 1, 1908.
1,303,780.
Patented May 13, 1919.
5 SHEETS—SHEET 4.
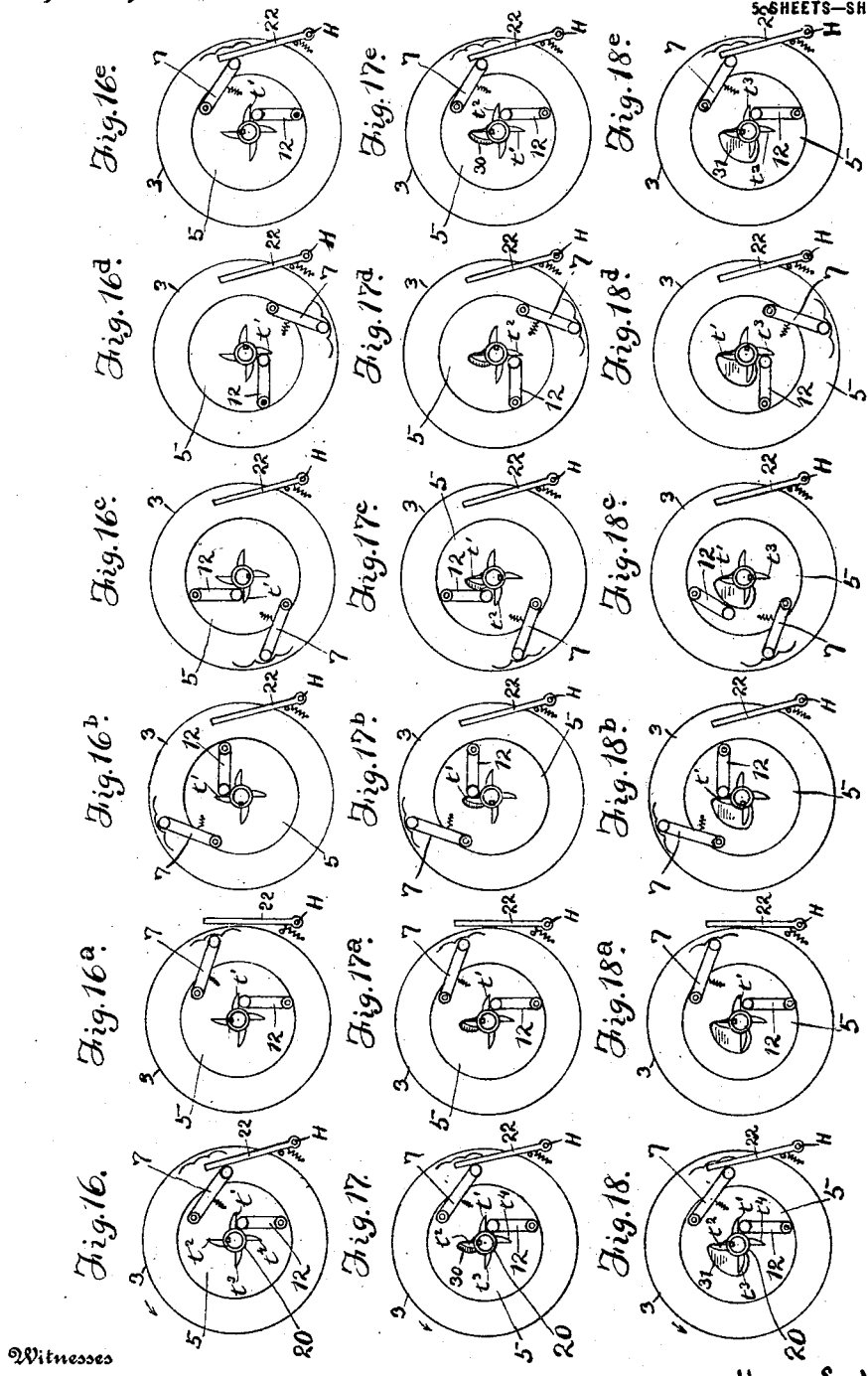
Witnesses
Stuart Hilder.
George E. Edelin.
By
Inventor
Harry L. Dooley
H. H. Bliss
Attorney

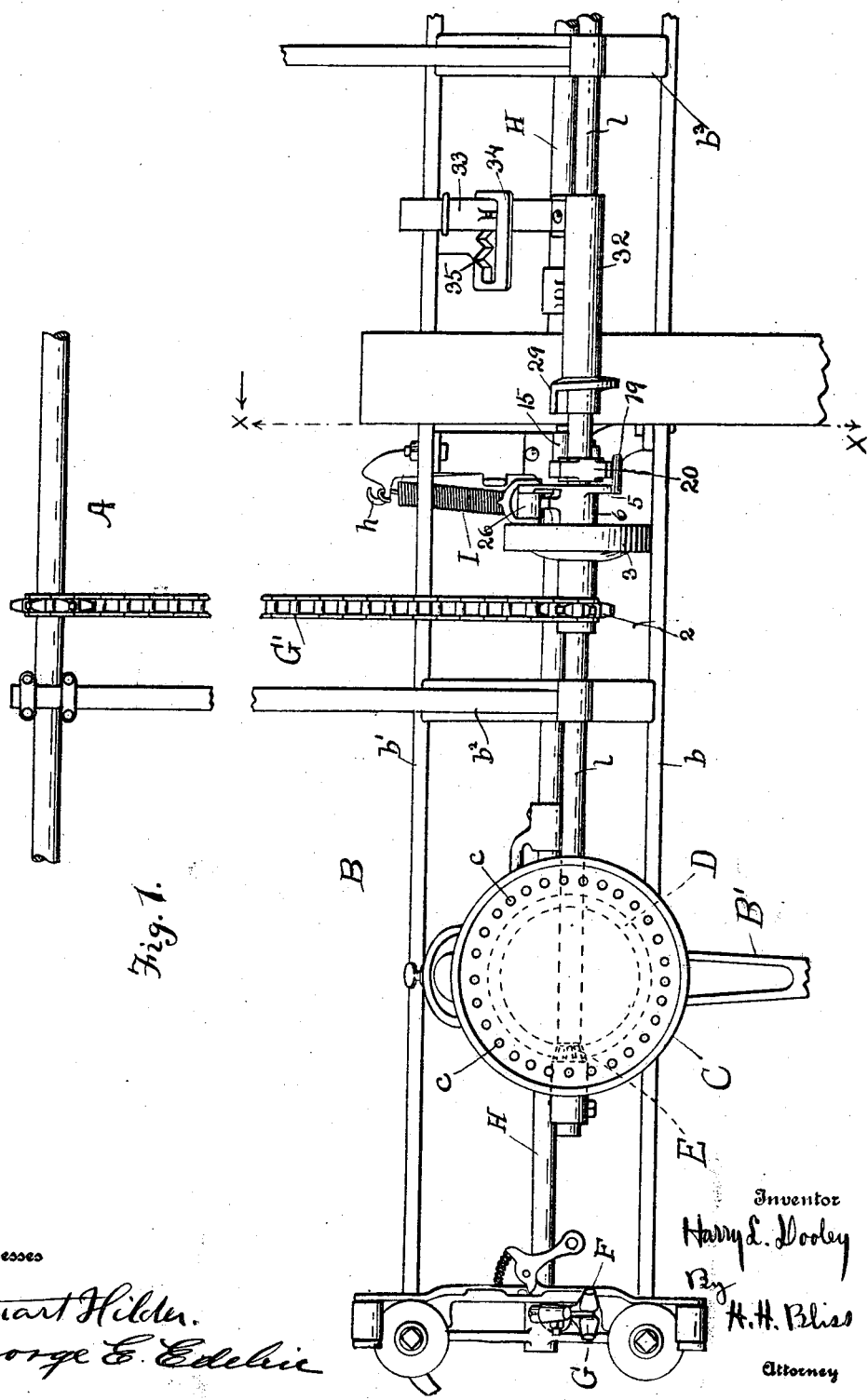

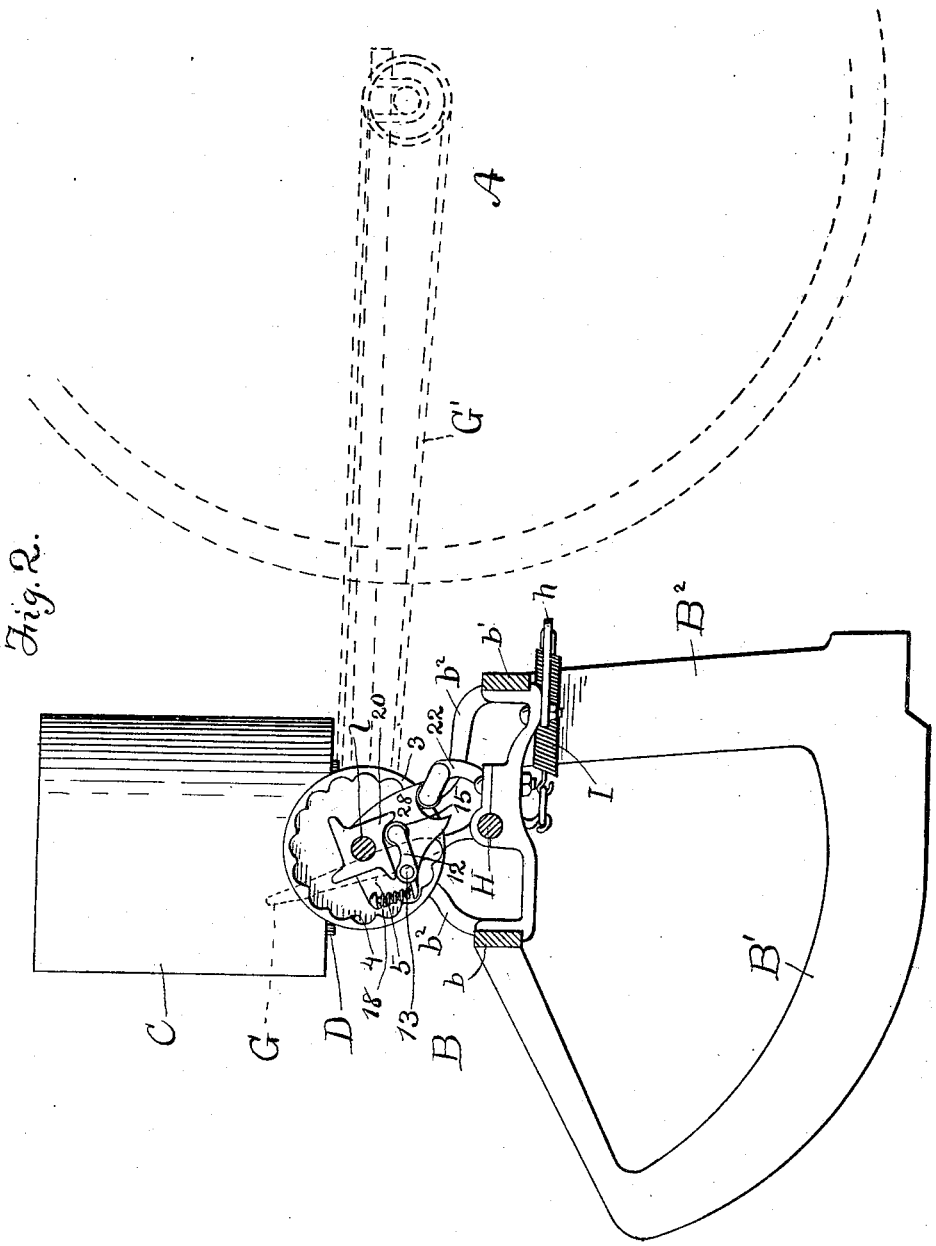

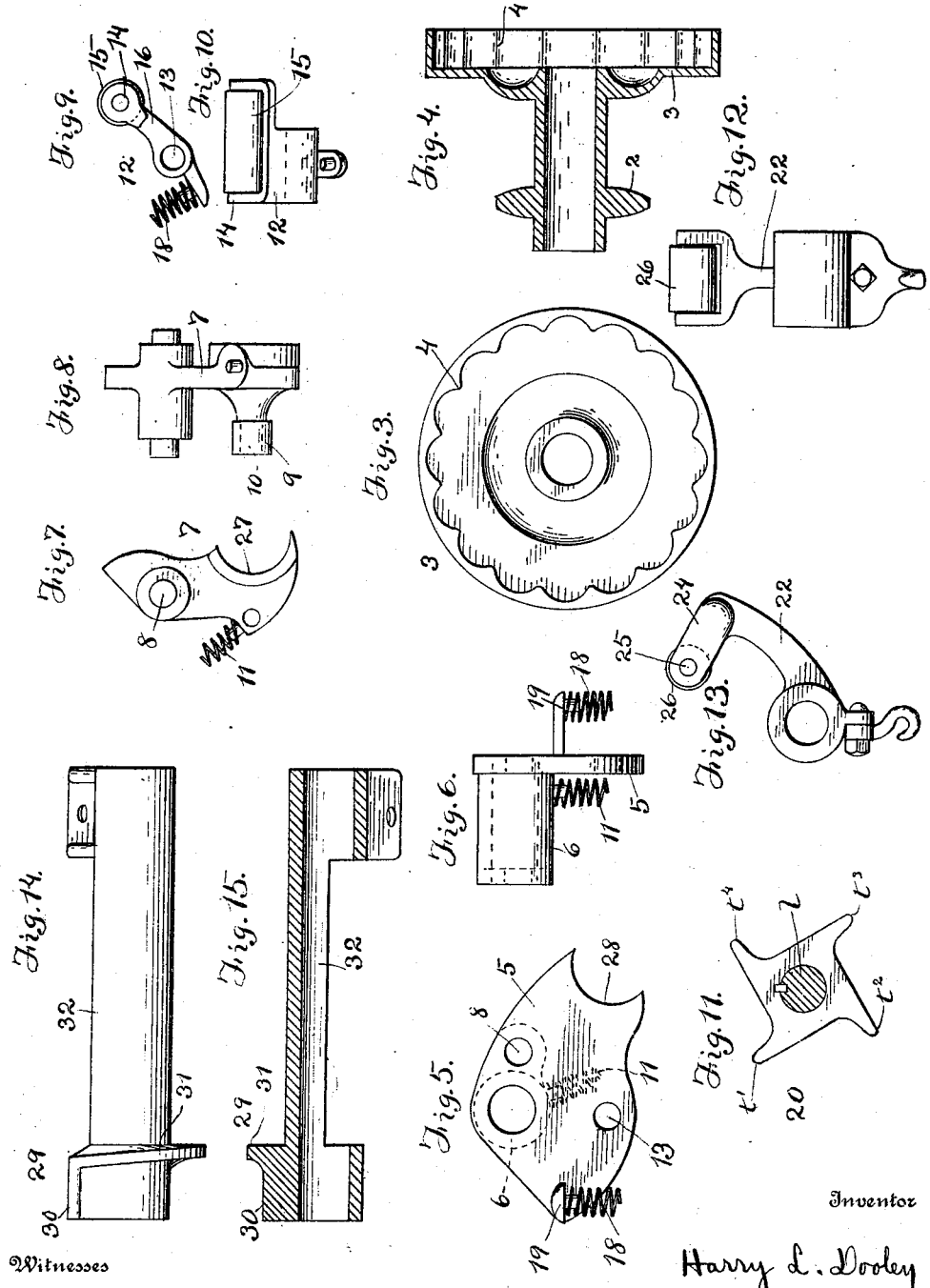

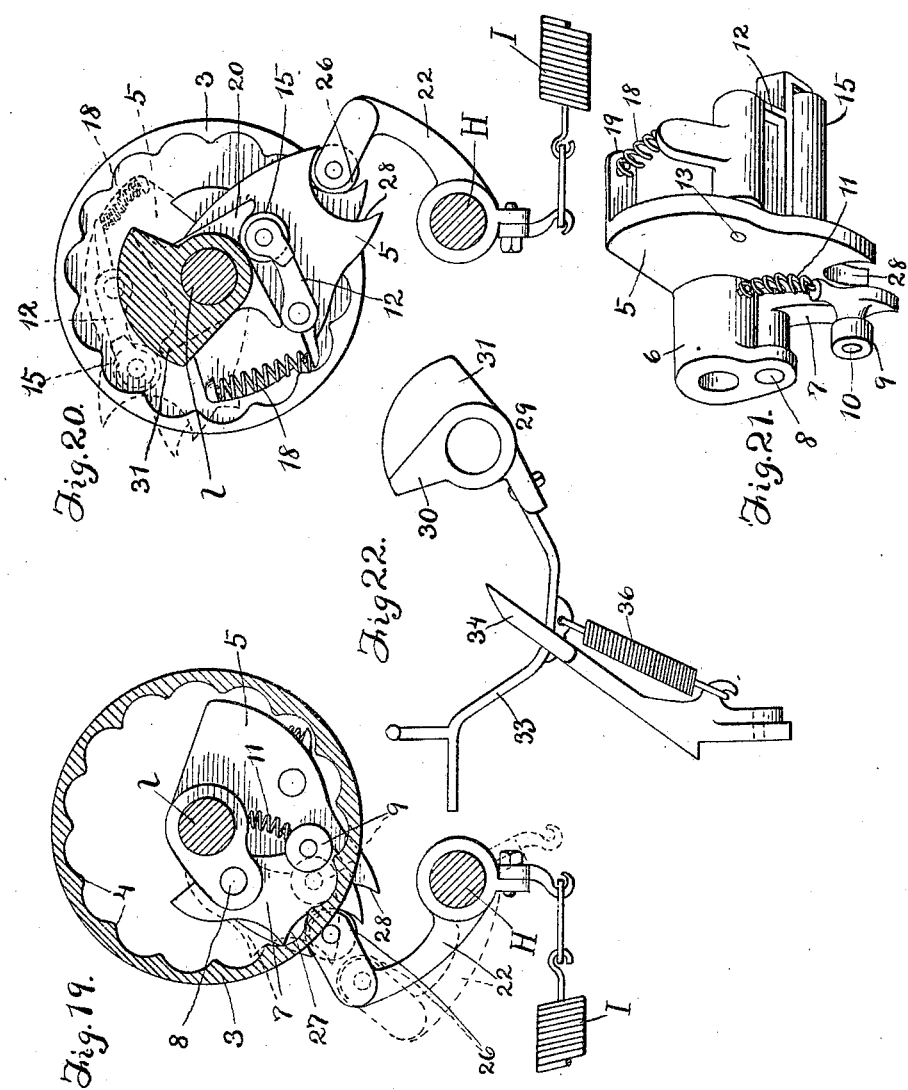

UNITED STATES PATENT OFFICE.

HARRY L. DOOLEY, OF ROCK ISLAND, ILLINOIS, ASSIGNOR TO DEERE & MANSUR COMPANY, OF MOLINE, ILLINOIS, A CORPORATION OF ILLINOIS.

PLANTER.

1,303,780.  Specification of Letters Patent.  Patented May 13, 1919.

Application filed December 1, 1908. Serial No. 465,525.

*To all whom it may concern:*

Be it known that I, HARRY L. DOOLEY, a citizen of the United States, residing at Rock Island, in the county of Rock Island and State of Illinois, have invented certain new and useful Improvements in Planters, of which the following is a specification, reference being had therein to the accompanying drawing.

This invention relates to improvements in devices for planting seeds, particularly those used in planting corn. The invention relates, among other things to providing a mechanism by which the seeds can be accurately counted at the time of separating them from the initial mass; means accurately delivering the seeds, in predetermined numbers, at intervals, to the desired places in or on the ground; means for transmitting power from the ground wheels to the seeding mechanism for effecting the starting, counting and delivering of the seeds; and devices for varying the number of seeds delivered at each dropping action.

The several parts which can be employed for attaining the purposes of the invention, together with their relations and modes of action, will be readily understood from the description given below.

In the drawings I have shown one form of mechanism embodying the several features of the invention, but it will be understood that there can be variations in numerous respects without departing from its essential features.

Figure 1 is a plan view of a part of a corn planting machine embodying the said improvements.

Fig. 2 is a vertical section taken on the line *x—x* of Fig. 1.

Fig. 3 is a face view of the loose clutch wheel.

Fig. 4 is a section of the clutch wheel and its driving sprocket.

Fig. 5 is a face view and Fig. 6 is a side view of the clutch plate.

Fig. 7 is a side view and Fig. 8 an edge view or elevation of the pivoted clutch arm.

Fig. 9 is a side view and Fig. 10 a side elevation of the lever arm interposed between clutch plate and the shaft.

Fig. 11 is a face view of the toothed wheel secured to the seeder shaft.

Fig. 12 is a plan view and Fig. 13 is an edge view of the trip lever.

Figs. 14 and 15 are an elevation and a longitudinal section, respectively of the device for disengaging the clutch from the seeder shaft.

Figs. 16 to $16^e$ inclusive are a series of diagrams illustrating the positions and actions of the parts of the clutch, and the parts interposed between the clutch and the seeder shaft, at the time when the planter is dropping four kernels to a hill or at the end of each planting interval.

Figs. 17 to $17^e$ are a series of diagrams similar in character and purpose, illustrating the position and actions of the parts during a cycle when they are set for delivering three seeds or kernels to a hill, or at the end of each interval.

Figs. 18 to $18^e$ inclusive are a series of similar diagrams illustrating the parts and their actions during each cycle when they are adjusted for delivering two seeds or kernels to a hill, or at the end of each interval.

Fig. 19 is a cross sectional view along the line 19—19 of Fig. 1 through the wheel 3 and looking toward the clutch mechanism in a plane such that the interior corrugations upon the wheel 3 are shown, but such that the flat disk part of this wheel is in planes in front of the paper.

Fig. 20 is a cross sectional view along the lines 20—20 of Fig. 1 in a vertical plane through the cam disk 31 on the part 29, looking toward the clutch mechanism and, therefore, in a direction opposite to that in which Fig. 19 is viewed.

Fig. 21 is a perspective of the parts 5, 7 and 12 in assembled relation to one another.

Fig. 22 is a view showing the cam structure 29 and the means for adjusting it to its different positions longitudinally along the shaft 1, the view being taken looking from the cam end of the part 29 toward the adjusting mechanism.

The parts of the planting mechanism which have been selected for the purposes of illustration comprise a rear frame A, mounted as usual upon two ground wheels, and a front frame B, these two frames being hinged together on a horizontal axis and having any preferred form of adjusting mechanism for bringing them to the desired relations to each other and securing them in the desired relative position.

The front frame B has at the ends ground opening or furrow opening runners B¹, which may be of the usual character, and seed conducting chutes or boots at B² provided with valves for receiving, temporarily holding, and delivering the seeds or kernels which may be deposited upon them.

The frame B has by preference a front transverse bar $b$, and a rear $b^1$. These are connected together by cross bars or braces as shown at $b^2$, $b^3$.

At each end of this frame, that is to say, on each side of the mechanism as an entirety, is placed a seed receptacle C. Into this a quantity of the seed can be placed and at the bottom it can be provided with any known or suitable delivering device. I have indicated that there is present in the machine in the drawings a rotary plate at the bottom of each of said receptacles capable of receiving the seeds from the mass and also capable of being rotated so as to deliver them to the aforesaid chutes or boots and to the valve device therein.

Seed plates are now known of numerous sorts, any one of which can be used in this place and for this purpose. I have indicated a circular plate with a circular series of apertures or cells; but instead thereof use can be made of any of the forms of "edge-drop" plates such, for example, as are shown in my Patent No. 682,178, dated Sept. 10, 1901.

The seed plates are rotated by horizontal gearing at D and driving pinions E. Here also there can be numerous modifications, as numerous forms of construction and various arrangements of these parts are now well known.

The mechanism illustrated is also provided with what is known as a "check-row" apparatus, there being a check head at F on each side of the machine, each outside of a seed box or receptacle. These check heads and their several parts may be of any preferred form. As shown, each has a check fork at G with which engages the tappets on the check row wire. The check forks are connected to a rock shaft H which extends across the machine on lines below the seed receptacle, by preference. A spring at I is connected to a crank arm $h$, this spring tending to hold the rock shaft H in a predetermined position and so as to have the check forks held vertically.

The seeder shaft is indicated by 1, this extending across the machine on a line below the seeder boxes and having secured to it the pinions E, E.

It is repeated that the parts above described are here illustrated and referred to as constituting one of the mechanisms to which parts can be applied that more particularly embody the essential features of the invention.

The shaft 1 is rotated from the ground wheels or covering wheels, or from the axle upon which they are mounted. As shown, power is transmitted to the front frame by a sprocket chain G' engaging with a sprocket wheel 2, mounted loosely on the shaft 1. The sprocket wheel is cast with, or rigidly secured to a clutch element 3, which, as shown, consists of a wheel or short drum 3 having internal teeth 4. Normally, the sprocket wheel 2 and the toothed drum 3 are continuously rotating under the action of the chain G as the machine advances.

At times, it is desired to obtain from one rotation of this sprocket 2, and wheel 3, a predetermined part of one rotation of the shaft; at other times, to obtain from one rotation of the sprocket wheel another predetermined part of a revolution of the shaft 1; and at still other times, during one revolution of the sprocket still another predetermined part of a rotation of the shaft. This is accomplished by the following devices:— 5 is a plate having a tube 6 which is loosely mounted on the shaft 1. The plate part 5 projects radially from the shaft in a plane a short distance from the clutch wheel 3. To this part is pivoted a clutch arm 7, the axis at 8 of the pivot which connects them being eccentric to the axis of the shaft 1. This clutch arm 7 carries a roller 9 mounted on a stud 10 which extends laterally from the arm, the roller normally lying in the transverse planes of the teeth 4 on the clutch wheel 3.

The arm 7 can be swung toward or away from the axis of the shaft and toward and from the teeth 4. A spring 11 bears against the outer end of the arm and tends to swing it into such position that it can be engaged by the teeth 4 of the clutch wheel 3.

It will be seen that the arm 7 can be pressed so that roller 9 will be swung inward away from the circles of rotation of the teeth 4, and if the arm be held in that position the sprocket wheel 2 and clutch wheel 3 will continue rotating without affecting either the plate 5 or the arm 7, they remaining stationary, and the shaft 1 also. But if the arm 7 is allowed to be pressed outward by the spring 11 it will be engaged by the teeth 4, and the arm and the plate 5 will be rotated with the sprocket and the clutch wheel, said arm and plate turning freely on the shaft unless connected in some way with the latter. The plate 5 can be connected to the shaft as follows:— On the side of the plate opposite to the side where the arm 7 is placed there is mounted a lever 12. It is connected to the plate by a pivot at 13 which is eccentric to the axis of the shaft 1. At 14 there is a crank pin extending laterally from the lever 12 and this is preferably provided with an anti-friction roller 15. The pin 14 and the roller 15 are on the longer arm 16 of this le ver 12. 18 is a spring engaging with the short arm 17 and also engaging with an abutment at 19 on the plate 5.

Immediately adjacent to this loosely mounted plate 5 there is a toothed wheel 20 rigidly secured to the shaft 1 and having, in the particular construction shown, four teeth $t^1$, $t^2$, $t^3$, $t^4$. The lever arm 12 is so positioned that, normally, the spring 18 tends to move the crank pin 14 and the roller 15 inward so as to lie inside of the outer circles of rotation of the teeth, $t^1$, $t^2$, $t^3$, $t^4$. But the lever arm can be moved so that the pin 14 and the roller 15 shall swing outside of the said circles of rotation. When they are outside of the teeth $t^1$, $t^2$, $t^3$, $t^4$, the sprocket wheel 2 and the clutch wheel 3 will rotate loosely on the shaft, the latter remaining stationary. But if the crank pin 14 and the roller 15 are in their innermost position they will engage with one or another of the teeth $t^1$, $t^2$, $t^3$, $t^4$, and at such time, if the clutch arm 7 is engaged by the clutch wheel 3, rotation will be imparted to the whole train of parts, namely, the train commencing with the sprocket wheel 2 and terminating with the wheel 20, the shaft 1, and the seed plates C.

The clutch arm 7 is, normally, held in its position of disengagement from the clutch wheel 3 by means of the lever or crank arm 22. This is secured to the rock shaft H. The rock shaft is actuated in the usual manner by the check row fork at the side of the machine, there being as usual a check row head at each side with a fork connected to this shaft H.

The crank arm or lever 22 is bent forward somewhat at its outer end, as shown at 24, and has a laterally extending pin 25 with a roller 26. This roller lies in the planes of rotation of the clutch arm 7 and of the plate 5, the arm having at 27 a cavity or seat to receive the roller 26, and the plate 5 having a similar seat at 28.

To cause the crank pin and its roller 15 on the lever arm 12 to move to a position outside of the circles of rotation of the teeth $t^1$, $t^2$, $t^3$, $t^4$, use is made of an adjustable cam structure 29. It has two parts, one being a cam at 30 of a relatively short arc length and the other a cam at 31 of relatively longer arc. These are of the nature of a head carried by and preferably cast with a supporting and adjusting sleeve 32, which fits loosely upon the shaft 1 and can slide along it. The cam parts 30, 31 have gradual approaches. When the cam element is in one position, longitudinally of the shaft, the came part 30 lies in the plane of rotation of the end part of the roller 15 and the latter is thrown outward during one-fourth of a revolution of the plate 5. If the cam element is moved to such position along the shaft that the cam section 31 is in the plane of revolution of the end part of the roller 15, the latter will be thrown outward and held away from the teeth of wheel 20 during two-quarters of a revolution of the plate 5.

In order that the ends which I aim at may be understood, reference can be made to the series of diagrammatic views in Figs. 16 to $18^e$. When the parts are operating in such way as to deposit four seeds or kernels in each hill, the diagrammatic views from 16 to $16^e$ will illustrate the successive steps in rotation of the clutch and its adjacent parts. Referring to said diagrams it will be seen that the clutch arm at 7 is held out of engagement with the clutch wheel 3 by the arm 22 on the rock shaft H and at such times the clutch wheel 3 is freely revolving while the other parts interposed between it and the shaft 1 remain stationary, as shown in Fig. 16. But if the holder 22 be withdrawn for an instant from the clutch arm 7 the latter is forced by its spring into engagement with the clutch wheel 3 and thereupon rotation is imparted to the plate 5 and by the latter to the lever 12, this being in engagement with the toothed wheel 20, the shaft 1 will be turned through one revolution, the tooth $t^1$ being advanced to the positions, successively, of the teeth $t^2$, $t^3$, $t^4$, as shown in Figs. $16^a$ to $16^e$, and finally brought back to its initial position as shown at $16^e$. At the instant this latter position is reached the part 22 pressing against the clutch arm 7 forces it away from the clutch wheel 3 and the plate 5 and all the parts connected with it remain stationary while the clutch wheel 3 continues to rotate.

In other words, when the parts are in the relative positions just described, and illustrated in this series of diagrams, a complete rotation is imparted to the shaft 1, which complete rotation may be considered as composed of four equal parts.

At the termination of each one of these parts of rotation of this shaft, one of the seed or kernel apertures $c$ in each seed plate C is carried around to its depositing point and drops its seed or kernel; and four of the latter will be dropped.

If it is desired to drop three kernels in a hill, the clutch and the parts adjacent thereto go through a cycle diagrammatically illustrated in the series of Figs. 17 to $17^e$. The holder at 22 being dropped back, as shown in Fig. $17^a$, the clutch arm 7 drops into engagement with the wheel 3, and the plate 5, through the lever 12, moves a quarter during the revolution of the shaft 1, bringing the tooth $t^1$ to the position of the tooth $t^2$, as shown in Fig. $17^b$. If, just prior to this, the cam 30 has been moved to the path of the roller 15, the latter rides up the cam to points outside of the teeth $t^1$, $t^2$, etc., and after being carried a short distance by the plate 5, drops down into engagement with the tooth $t^2$ on the wheel 20, and remains in engagement with that tooth while the plate 5 travels past the position shown in Fig. 17$^a$ and reaches the position shown in Fig. 17$^e$, at which latter position the holder 22 moves the clutch arm 7 out of engagement with the clutch wheel 3 and the plate 5 and the shaft 1 thereafter remaining stationary.

It will be seen that during this cycle illustrated in these diagrams from Fig. 17 to Fig. 17$^e$, the lever 12 is out of action during one-quarter of a revolution of the clutch 3 and plate 5, that is to say, the shaft 1 has imparted to it only three-quarters of a revolution; and as each fourth of a revolution corresponds to the distance of travel of one of the seed cells it will be seen that during such cycle three cells will be advanced and three kernels dropped in a hill.

If at any time it is desired to drop two kernels in a hill the parts described are caused to move from one to the other of the positions, which are diagrammatically illustrated in Figs. 18 to 18$^e$. In this case after the holder 22 releases the clutch arm 7, and the plate 5 and shaft 1 begin rotation, as shown in Figs. 18$^a$ and 18$^b$, the lever arm 12 is thrown out of engagement with the tooth $t^1$ by the cam 31, and the latter is of such length as to be inactive during two-quarters of the revolution of the plate 5 and travels idly around one-half of the circle until it escapes from the cam 31, when it drops down into engagement with tooth $t^3$, and remains in engagement therewith during the remaining quarter of the revolution of the clutch. When the tooth $t^3$ reaches the position initially occupied by the tooth $t^1$ at the commencement of the cycle, the holder 22 presses the clutch arm 7 away from the clutch wheel 3 and the plate 5 and the parts driven thereby come to rest and remain stationary while the sprocket and clutch wheel 3 continue rotating.

It will be seen that while the parts are related and moving in the way described, first, the shaft 1 will have imparted to it one-quarter of a revolution of the mechanism, then, the shaft will remain stationary for two-quarters of a revolution and, finally, will again move through one-fourth of a revolution, this resulting in bringing two of the seed cells or kernel apertures of the seed plates to the dropping point in each seeding mechanism.

The operator can cause the clutch devices to so actuate the shaft as to obtain any of its dropping actions by the sliding of the cam element 29 toward or from the plate 5. This sliding he accomplishes by means of the foot lever or arm 33 which passes through a guide-way 34, the latter having in one of its edges stop notches 35. A spring 36 normally tends to press the arm 33 into one of the notches 35 and to hold the sleeve in one position or another until it is released by the foot and moved to another notch.

The operation of a mechanism containing my improvements will be readily understood from the drawings and the above description.

Assuming that the preliminary conditions have been met, that is, that the check-row wire has been properly placed across the field and on the check head supports, and that the parts of the clutching apparatus are set for planting three kernels to the hill, the following actions will occur as the machine moves across the field parallel to the wire. As it advances the ground wheels and axle through which the chain G' causes a continuous rotation of the sprocket wheel 2 and the clutch wheel 3.

When the machine approaches one of the tappets on the wire it engages with the check fork G and imparts a comparatively quick rocking action to the shaft H which, in turn, effects the opening of the valve or valves of the seed conducting chutes, and at about the same instant effects also the backward movement of the trip lever 22. The latter action brings the crank pin 25 and roller 26 out of engagement with the clutch arm 7. Thereupon the arm instantly is engaged by one of the teeth 4 of the clutch wheel 3. Rotation at once commences of the plate 5, and the lever arm 12, which being in engagement with one of the teeth $t^1$, etc., on the wheel 20, imparts movements to the seeder shaft 1, such as are indicated by the diagrammatic views 17 to 17$^e$, these movements resulting in two movements of the seeder shaft, one movement being equal to one-quarter of a revolution and the second being equal to two-quarters of a revolution, the cam at 30 taking the roller 10 out of action during one-quarter of a revolution and allowing the shaft to remain stationary.

Each of the seed plates at C has, during the steps just referred to, imparted to it a movement equal to the distance from one seed cell to the next and then after a pause a movement equal to the distance between one seed cell and the second behind it, or in other words, the total movement of the seed plate is equivalent to three of the distances from one seed cell to the next. Consequently there will be three kernels dropped during the single revolution of the plate 5.

During the operation just referred to, the short section 30 of the cam element 29 lies in the path of the roller 10.

When it is desired to deliver any other number of kernels, say two at each dropping action, the driver, by his foot releases the cam sleeve 32 from the central notch and slides it toward the clutch mechanism, that is until the foot lever reaches the next notch;

this throwing the longer cam section 31 into the plane of rotation of the roller 9. The actions during any cycle are then such as are above described and illustrated in the series of diagrams from Figs. 18 to 18°.

If it is desired to drop four kernels to the hill, the cam element 29 is, by the driver's foot, withdrawn entirely from the plane of rotation of the roller 9; and consequently the roller remains at a fixed radial distance from the axis and in engagement with one of the teeth $t^1$, etc., of the wheel 20, during the entire cycle. During this time the several parts are moved in the manner and to and from the several positions shown in the series of diagrams in Figs. 16 to 16°.

When the cam device is in its inoperative position corresponding to Figs. 16 to 16°, the planter can be adapted for drilling in the usual way, i. e., by throwing the check fork back so that the lever 22 will not cause the disengagement of the clutch device. The seed plate is then driven continuously and the seeds delivered and dropped one at a time.

From the description above given and an inspection of the apparatus illustrated, it will be seen that I combine with the seed plate, which may be regarded as the means for counting or measuring seeds or kernels, a primary power transmitter or driver, here typified by the sprocket wheel and clutch wheel 3, and a secondary driver typified for example by the plate 5 and its attachments, together with means for connecting the secondary driving element with the primary driver during a predetermined cycle of movement (in this instance one complete rotation of the secondary driving element), and also means which are controllable at will for holding the secondary driver in continuous connection with the counting or measuring mechanism during the entire period of said cycle, or for holding it in connection with the counting or measuring mechanism during each of several minor periods included within the said cycle, during said periods there being a series of movements of varying magnitudes imparted to the counting or measuring mechanism.

I am aware of the fact that mechanisms of this general class have been heretofore made or proposed wherein use was made of a primary power transmitter or driver running continuously and loosely, together with means interposed between it and the counting or measuring mechanism which should have a predetermined cycle; but in said earlier mechanisms there was but one impulse or movement imparted to the measuring or counting mechanism during the said cycle; whereas in my case the cycle (as for example the one complete rotation of the plate 5) is fixed and determined by the conditions of the parts of the mechanism as an entirety, and this cycle remains the same irrespective of any varying adjustments that are effected by the means that are operated at will. In other words, I so construct and relate the parts that during this fixed and invariable cycle of a driving element I can impart power therefrom to the counting or measuring mechanism with a series of movements of the latter of varying magnitudes, but all occurring during the said cycle.

What I claim is:

1. In a two-row planter, the combination with the two seed dropping plates, and a common seeder shaft directly geared to both plates, of a continuously operating mechanism including the ratchet wheel, a clutch comprising a sleeve carrying two pawls and mounted loosely on said shaft, one of said pawls adapted to be thrown into engagement with said ratchet independently of the shaft to be moved a predetermined distance, and the second pawl adapted to be thrown into driving connection with the said shaft and dropping plates, and a sliding head having inclined approaches to lift the pawl out of engagement with the seed dropping plate operating mechanism.

2. In a planter, the combination with a seed plate and the shaft for actuating the same, of a constantly operating mechanism, and means for connecting said shaft and said constantly operating mechanism, comprising a revoluble device adapted to be connected to the constantly operating mechanism for a constantly predetermined amount of movement, a ratchet connected with said shaft, a pawl connected with the revoluble device and normally engaging said ratchet, a sleeve on the shaft provided with a cam head having cam tracks of varying lengths, and a lever for moving said head to engage said pawl and disengage it from said ratchet during a part of said movement of the revoluble device.

3. In a two-row planter, the combination with two seed dropping plates and a common seeder shaft carrying a rigid gear wheel for each of said plates, of a continuously operating mechanism including a ratchet wheel, a clutch comprising a body supplemental to and movable independently of said shaft and carrying two pawls, one of said pawls adapted to be thrown into engagement with said ratchet to be moved a certain predetermined distance, the other pawl adapted to be thrown into connection with said shaft and seed dropping plates during the whole or part of the predetermined movement of the first said pawl, and an adjustable element surrounding the seeder shaft and optionally movable toward and from the last said pawl and provided with a series of cams all rigid and integral with the adjusting element and provided with differential cam surfaces, respectively adapted to hold the said pawl out of action for differing parts of the clutch movement.

4. In a two-row planter, the combination with the two seeder plates of the shaft for driving said plates and having fixed driving connection therewith, the continuously acting driving mechanism, the means for transmitting power from the driving mechanism to the shaft comprising a pawl-like part adapted to be given an intermittent movement through a predetermined range around and independently of the shaft and a second pawl-like part rotatable around the shaft, and an adjustable sleeve mounted on and movable longitudinally of the shaft and adapted to cause a variable disconnection of the said second pawl-like part from the shaft while said part is being moved by the continuously acting driving mechanism, substantially as set forth.

5. In a two-row planter, the combination with the two opposite seed dropping plates and the shaft geared in fixed relation to both of the said plates, of a continuously operating mechanism, including a ratchet wheel, a clutch comprising a sleeve mounted loosely on the said shaft and carrying two pawls, one of said pawls adapted to be thrown into engagement with said ratchet to be moved a certain predetermined distance and the other pawl adapted to be thrown into connection with said shaft and both of said dropping plates, a roller carried on said pawl, and means including a sliding head around said shaft over which said roller travels for disengaging the pawl from the plate dropping mechanism.

In testimony whereof I affix my signature, in presence of two witnesses.

HARRY L. DOOLEY.

Witnesses:
GEORGE E. EDELIN,
A. G. RUSSELL.

Copies of this patent may be obtained for five cents each, by addressing the "Commissioner of Patents, Washington, D. C."